UNITED STATES PATENT OFFICE.

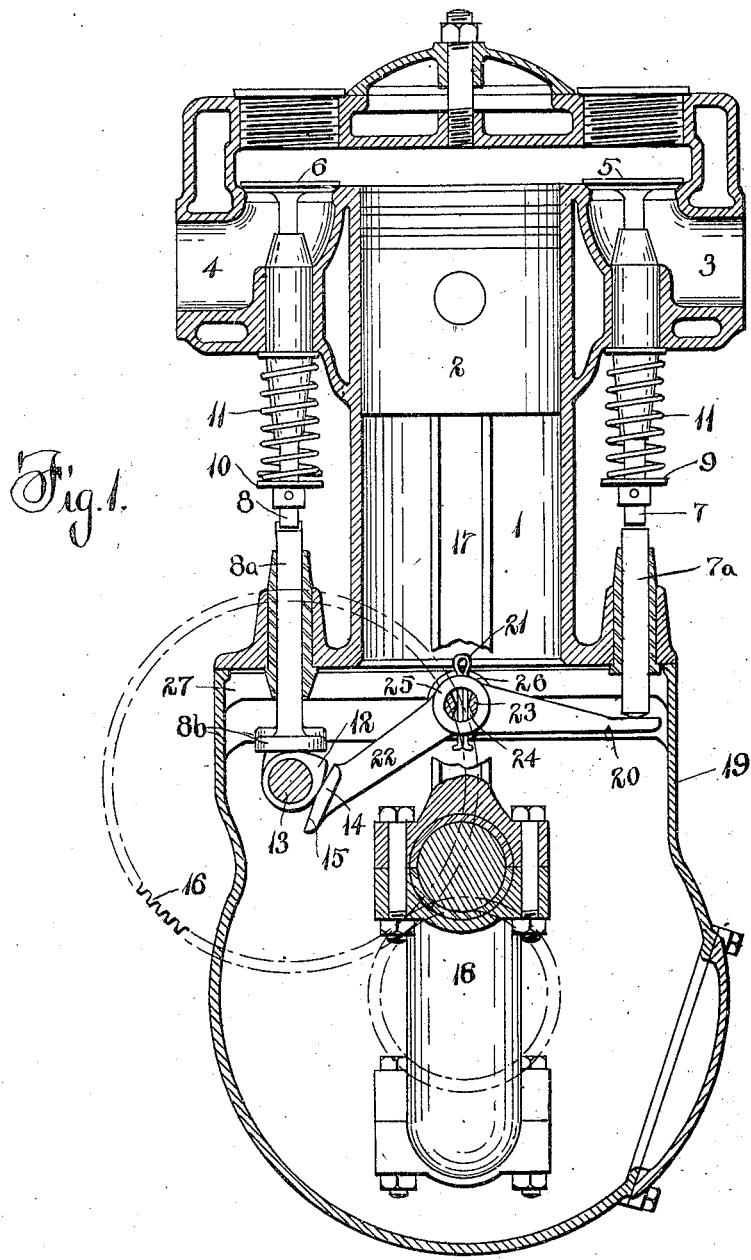

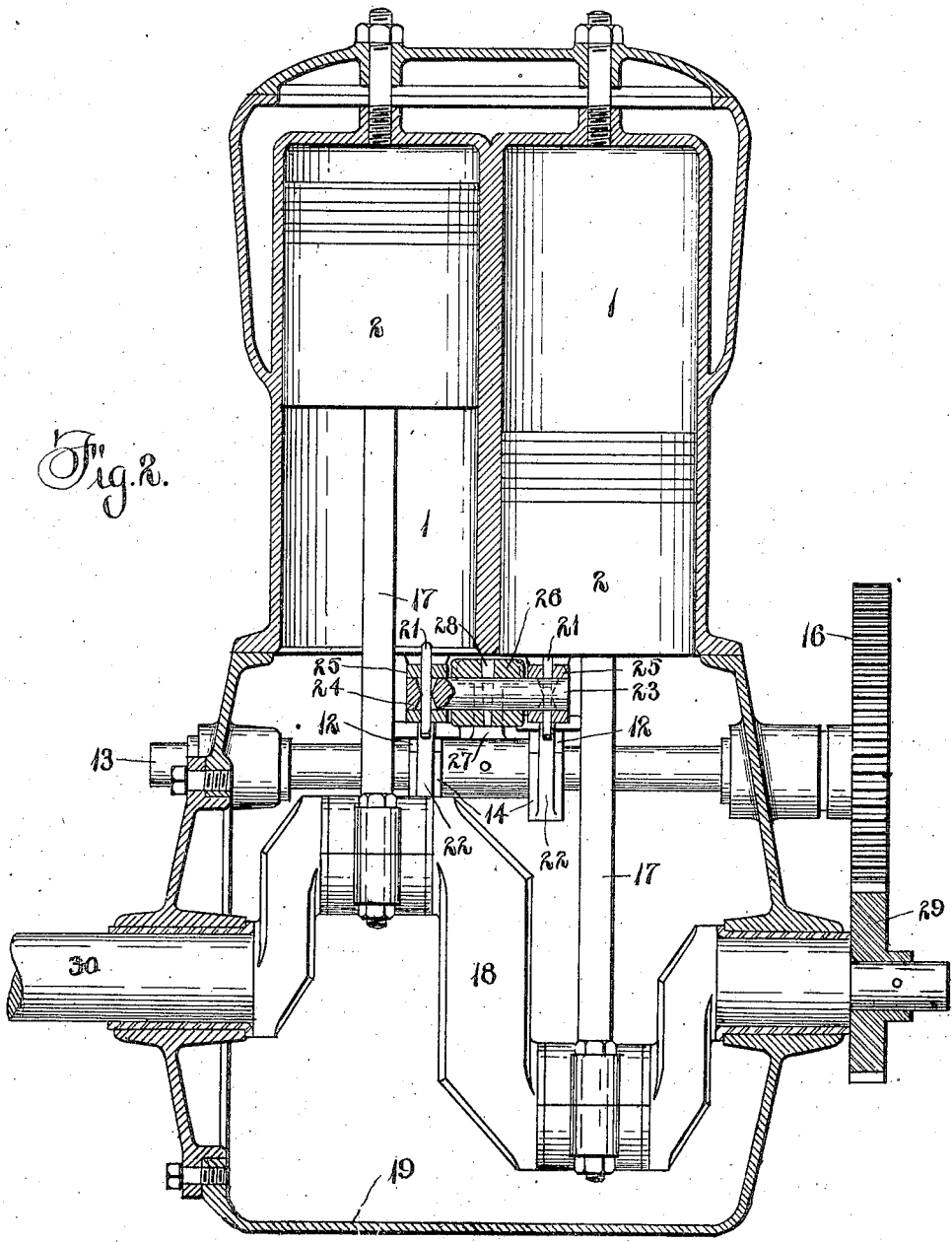

FRANK J. MILLER, OF CLEVELAND, OHIO.

VALVE-CONTROLLING MECHANISM FOR INTERNAL-COMBUSTION ENGINES.

962,159.     Specification of Letters Patent.    Patented June 21, 1910.

Application filed October 4, 1909. Serial No. 520,787.

*To all whom it may concern:*

Be it known that I, FRANK J. MILLER, citizen of the United States, residing at Cleveland, in the county of Cuyahoga and State of Ohio, have invented certain new and useful Improvements in Valve-Controlling Mechanisms for Internal-Combustion Engines, of which the following is a specification.

This invention relates to certain improvements in valve controlling mechanism for internal combustion engines and has for its object to provide means for actuating the intake and exhaust valves of an engine which are disposed on opposite sides of the cylinder thereof by a single cam shaft and a single cam in such a manner that the respective valves are given different timing, in order to increase the efficiency of the engine.

A further object is to provide an improved means for mounting a rocking lever on a stationary pin so as to give the lever a limited swinging movement and preventing any lateral movement.

It has been found in engine construction, especially in automobile practice, that the efficiency of an engine is increased by having the intake and exhaust valves disposed on opposite sides of the cylinder and also to have a difference in the timing of the said valves, the timing of the opening of the exhaust valve being slightly greater than that of the intake valve. As this practice is common a further description thereof is not thought necessary.

The engine hereinafter described and shown in the accompanying drawings has the above features therein and also the desired construction of only one cam shaft, therefore reducing the necessity of more than one cam shaft with all its accessories, such as bearings, gearing, etc. By operating the valves from one cam a saving is also made, as only half the number of cams are required to operate the valves, which are ordinarily used in engines having a variance in the timing of the opening of its valves.

The above objects are attained by a novel construction and arrangement of parts as is hereinafter described and claimed and as illustrated in the accompanying drawings, in which:—

Figure 1 is a vertical cross section of the engine, parts broken away, and Fig. 2 is a vertical longitudinal section thereof.

Similar numerals refer to similar parts throughout the several drawings.

The engine as shown in the drawings is of a double cylinder type and comprises cylinders 1, pistons 2, crank casing 19, crank shaft 18, opposed cranks 30, connecting rods 17, intake ports 3, valves 5 therefor having a lower stem 7 and push rods 7ª arranged to strike the stems, compression springs 11 bearing down on shoulders 9 to close the valves, exhaust ports 4, valves 6 therefor having lower stems 8 and push rods 8ª, compression springs 11 bearing down on shoulders 10 on said stems to close the valves, as is found in the standard engine of this type, together with a novel valve controlling mechanism to be hereinafter described.

A cam shaft 13 is located directly below the push rods 8ª which are provided with lower shoes 8ᵇ, said shaft bearing a cam 12 below each shoe 8ᵇ, and the cam shaft is geared to the crank shaft by gears 16 and 29, the former being on the cam shaft and twice the diameter of the latter to give the cam shaft one half the timing of the crank shaft as is necessary in a four cycle engine.

Extending laterally across the top of the crank casing and between the connecting rods is a beam 27 having at the middle thereof a longitudinally disposed sleeve 26 in which a bearing pin 23 is held with its ends extending beyond the ends of the sleeve but not far enough to interfere with the connecting rods. This pin 23 is held rigid with the sleeve by a cotter pin 28.

The pin 23 at its ends has vertical holes 24 therein made by countersinking a recess on each side thereof which recesses unite to form said holes 24 having a small diameter at the middle and diverging to a larger diameter at the ends.

On the ends of the pin 23 and over the holes 24 are mounted rockers having arms 22 and 20. The sleeves 25 of the said rockers are mounted loosely on the pin 23 and have diametrically disposed pins 21 which pass through the holes 24.

The arm 20 of the rocker projects under the push rod 7ª for the intake valve 5, while the other arm 22 extends outwardly and downwardly on the opposite side in a tangential to the cam 12 below the push rod 8ª for the exhaust valve 6. The arm 22 has a shoe 14 bearing against the cam 12, which shoe has a portion of its face cut away or beveled as is shown at 15. The shoes 8ᵇ and 14 rest against the cams 12 under all conditions, due to the compression of springs 11.

In operation, the cams 12 as they revolve with the cam shaft impart a downward movement to the arms 22 on the first downward stroke of the piston, thus raising arms 20 to lift the intake valves from their seats to allow proper intake of combustible gases; on the next or upward stroke the cams have passed the shoes 14 and the valves 5 have been closed by the compression of the springs 11 and the combustible gases are then compressed as the piston rises; on the second downward stroke the compressed gases are ignited by any convenient ignition system and the engine is given its motive power; on the last or second upward stroke the cams 12 lift the rods 8$^a$ and obviously open the exhaust valves to allow the burnt gases to escape. The cam 12 in sliding over the face of the shoe 8$^b$ and the face of the shoe 14 gives the shoe 14 and valve 5 operatively connected therewith the shortest timing, due to the bevel 15 on the latter shoe, which allows the rocker to return to its normal position quicker than a flat face like that of shoe 8$^b$ would allow its corresponding valve to close. If the direction be reversed the shapes of shoes 8$^b$ and 14 must be changed accordingly. In the manner described, a predetermined timing to the intake and exhaust valves is possible by appropriate angle or slope of the bevel 15, a greater slope of the said bevel lessening the timing of the corresponding valve.

The hole 24 allows the pin 21 and necessarily the rocker comprising arms 20 and 22 a limited swing due to the countersink at the ends of the hole, a lateral movement thereof is prevented as the central portion thereof bears lightly against the pin 21. This also reduces the friction, the pin 21 having only one point of contact with the pin 23 on all sides thereof at the center.

The shoes 8$^b$ of push rods 8$^a$ and the shoes 14 of the rockers may be substituted by rollers as are ordinarily used for this purpose, if desired, and where it is not essential that there should be a difference in the timing of the intake and exhaust valves. This substitution is preferable when the valves of the engine are to be given equal timing and this substitution if made is considered to come within the scope of this invention.

This mechanism can be adapted to various engines without departing from the spirit and scope of the following claims and the invention is not restricted to the form and arrangement of parts as described and shown.

I claim as my invention:

1. In an internal combustion engine, a valve gear including in combination, a bearing pin having a hole therethrough, the said hole diverging from the middle to its ends, a support for said pin, a rocker fulcrumed on said pin and operatively connected to the valve, a pin rigid with the rocker and extending through the said hole, and means to operate the rocker.

2. The combination with a cylinder having inlet and exhaust valves at opposite sides thereof, and a crank casing having guides at opposite sides thereof, of push rods working in said guides, to open the valves respectively a shaft located within the casing adjacent the inner end of one of the push rods and having a cam bearing thereon, and a rocker extending across the open end of the cylinder and within the casing and bearing at one end on the cam and at the other end on the other push rod.

3. The combination with parallel cylinders having inlet and exhaust valves at opposite sides thereof, and a crank casing to which the cylinders are joined, of push rods working through the casing at opposite sides thereof, to open the valves respectively, a shaft extending across the casing and provided with cams bearing on the push rods at one side of the cylinders, and rockers mounted on bearings in the crank shaft and extending across the open ends of the cylinders and bearing at one end on the cams at the other end on the push rods at the other side of the cylinders.

4. In a valve gear for an internal combustion engine, the combination with a cylinder having inlet and exhaust valves on opposite sides thereof, push rods arranged on opposite sides of the cylinder to open the valves respectively, a shaft adjacent the end of one of the push rods and having a cam bearing on said rod to operate same, and a rocker extending across the open end of the cylinder and bearing at one end on the cam and at the other end on the other push rod.

In testimony whereof, I do affix my signature in presence of two witnesses.

FRANK J. MILLER.

Witnesses:
STEDMAN J. ROCKWELL,
MONROE E. MILLER.